United States Patent [19]

Charvin

[11] Patent Number: 5,121,393
[45] Date of Patent: Jun. 9, 1992

[54] SYSTEM FOR TESTING A MICROPROCESSOR

[75] Inventor: Jean-Pierre Charvin, Eybens, France

[73] Assignee: SGS-Thomson Microelectronics S.A., Gentilly, France

[21] Appl. No.: 606,107

[22] Filed: Oct. 31, 1990

[30] Foreign Application Priority Data

Oct. 31, 1989 [FR] France .................. 89 14298

[51] Int. Cl.⁵ .......................................... G06F 11/00
[52] U.S. Cl. .................................................. 371/16.1
[58] Field of Search ................... 371/16.1, 27, 22.4, 371/22.5; 364/200, 900

[56] References Cited

U.S. PATENT DOCUMENTS

| 4,185,190 | 1/1980 | Bottard | 371/16.1 |
| 4,598,245 | 7/1986 | Groves | 371/27 |
| 4,823,307 | 4/1989 | Melgara | 371/16.1 X |
| 4,924,469 | 5/1990 | Tamaru | 371/16.1 X |

Primary Examiner—Robert W. Beausoliel
Attorney, Agent, or Firm—Richards, Medlock & Andrews

[57] ABSTRACT

A system for testing microprocessors is formed as an integral part of the chip. The microprocessor includes an instruction register that is converted into a counter during a test sequence. The counter successively provides codes of test instructions to an integral operation device during the test sequence. The results of the operations performed by the operation device are communicated to a polynomial counter. At the end of the test sequence, the result in the polynomial counter is decoded to automatically determine whether the microprocessor is operating correctly or is defective.

20 Claims, 2 Drawing Sheets

SYSTEM FOR TESTING A MICROPROCESSOR

BACKGROUND OF THE INVENTION

1. Field of the Invention

The invention concerns microcomputers made in the form of integrated circuit chips and, more particularly in such microcomputers, it concerns a system of tests that are performed on the chip.

2. Description of the Prior Art

As can be seen in FIG. 1, a computer comprises mainly: a central processing unit or processor 10 that performs arithmetic or logic operations on numbers; at least one memory 11 containing the numbers on which and through which said operations are performed; peripheral elements 12, such as a keyboard, printer and additional memory, which are used for entering the information to be processed and the operations to be performed, and for collecting the results of the operations performed; and transmission devices 13 and 14, called buses, which enable the different elements 10, 11 and 12 to communicate with one another. The central processing unit or processor 10 includes a register 15, called instruction register, that receives from the bus 13 the numbers or operation codes indicating the elementary operations to be performed, an operator device 17 that performs the elementary operations, and a device 16 to control said operations, that converts the codes of the elementary instructions into signals for controlling the device 17.

Of the transmission devices or buses 13 or 14, the device 13 (the data bus) is assigned the task of bidirectional transmission of data or operands on which the operations indicated by the operation codes in the register 15 are performed, while the other bus, 14, is assigned the task of one-directional transmission of the addressing codes of the memory 11 and of the peripheral elements 12. The operands are given by the memory and the operator device 17, while the addressing codes are generated by the operator device 17.

To perform an information processing operation, the processor carries out a sequence of operations, the operation codes or instructions of which are contained in the memory 11: these instructions as a whole constitute a program.

In present-day computers, the processor is made in the form of circuits that are integrated into a small-sized silicon substrate called a chip. At the end of the production line for the manufacture of these chips, the processors, also called microprocessors, have to be checked tested so that faulty components are detected and discarded.

Generally, the testing of a microprocessor consists, first of all, in generating input signals and ascertaining that the output signals conform to those expected in normal operation. There are many ways of carrying out such a test. In one of them, the microprocessor is connected to a testing machine which gives the input signals and compares the output signals with those that correspond to normal operation.

In another method, the testing is done by the microprocessor itself through the incorporation of specific elements on the substrate of the chip itself. The purpose of these specific elements is, firstly, to generate input signals and, secondly, to check the output signals. The input signals are obtained by a read-only memory (ROM). The output signals are checked by a polynomial divider or counter which gives a code at the end of the execution of the test program. This code is compared with the one that should have been obtained in the event of faultless operation, the latter reference code being recorded in the read-only memory.

This type of test, called an integrated test, has the following drawbacks. First of all, the performance of a complete test entails the use of a memory with a relatively high capacity, which is used solely by the test. This memory uses a non-negligible portion, either of the chip surface area when the memory is a single one, or of the program memory when this memory is integrated into a chip.

Then, this type of test entails the assumption that the processor is capable of reading the operation codes and the operands in the memory and that this memory is faultless. This factor, in the event of a fault at this level, leads to a divergence in the test sequence from the very start, and this divergence is not due to the failure of the processor.

Finally, a large number of operation codes do not entail any modification in the states of the data and address buses, but modify the content of the internal registers of the operator device 17 or of the so-called "status" bits. For a reliable test, the program associated with these operation codes should be designed to ascertain, by comparison and connection instructions, that the instruction has been carried out accurately within the operator device 17. This entails a correlative increase in the size of the read-only memory.

SUMMARY OF THE INVENTION

It is an object of the present invention, therefore, to make a system for testing a microprocessor, without the above-mentioned drawbacks. This system therefore performs a check on the microprocessor, including the internal registers and the status bits, without using any read-only memory.

The invention pertains to a system for testing a microprocessor made on an integrated circuit chip, said microprocessor including at least one instruction register to receive the operation codes of the elementary operations, an operator device to carry out the elementary operations, a device to control said elementary operations that converts said operation codes into elementary signals for controlling the operator device, a polynomial counter, an address bus that connects the operator device to the inputs of the polynomical counter, and a data bus that connects the instruction register, the operator device and the polynomial counter to one another, said test system including:

a first circuit to convert said instruction register into a test counter at the start of a test sequence and a second circuit to disconnect said test counter from the data bus at the start of a test sequence;

a third circuit to record an operation code as content in said counter at the start of the test sequence, said operation code corresponding to an instruction for reloading various elements of the microprocessor so as to preset the state of each of said various elements of the microprocessor at a respective predetermined value;

a fourth circuit to prepare, at the end of the execution of an instruction that has its code contained in said counter, a content saving instruction to save as code in the polynomial counter the contents of certain registers of the operator device and of the control device, and to increment the content of the test counter by one unit;

a fifth circuit to determine the end of the test sequence, and a sixth circuit to decode the code contained in the polynomial counter at the end of the test sequence.

Should the microprocessor be associated with a memory and should it be connected to this memory by address and data buses, the test system further includes a seventh circuit for the disconnection, during the test sequence of the inputs/outputs of said memory from the address and data buses.

The test system of the invention is also one wherein the output terminals of the polynomial counter are connected to the data bus by means of electronic gates, said gates being controlled so that said output terminals of the polynomial counter are connected to the data bus during the test sequence and thus provide the operands necessary for certain instructions to be carried out.

BRIEF DESCRIPTION OF THE DRAWINGS

Other objects, features and advantages of the present invention will appear from the following description of a particular exemplary embodiment, said description being made with reference to the appended drawings, of which.

DESCRIPTION OF A PREFERRED EMBODIMENT

Figure 1:
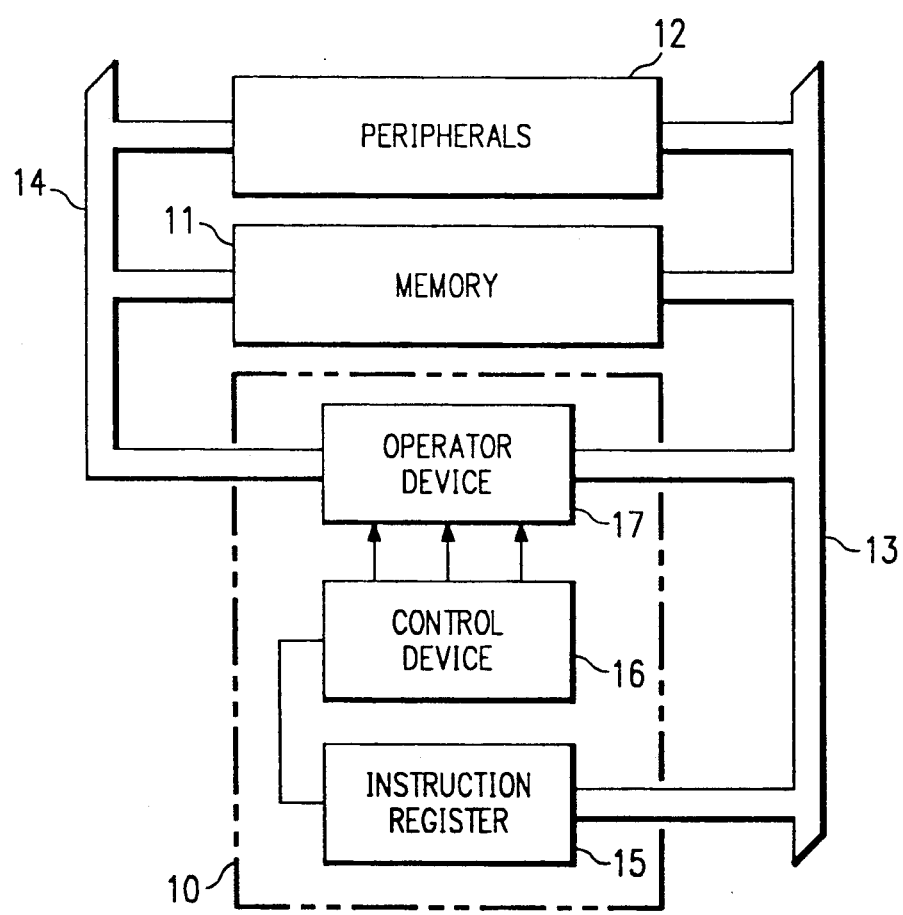
FIG. 1 is a block diagram of a computer.
Figure 2:
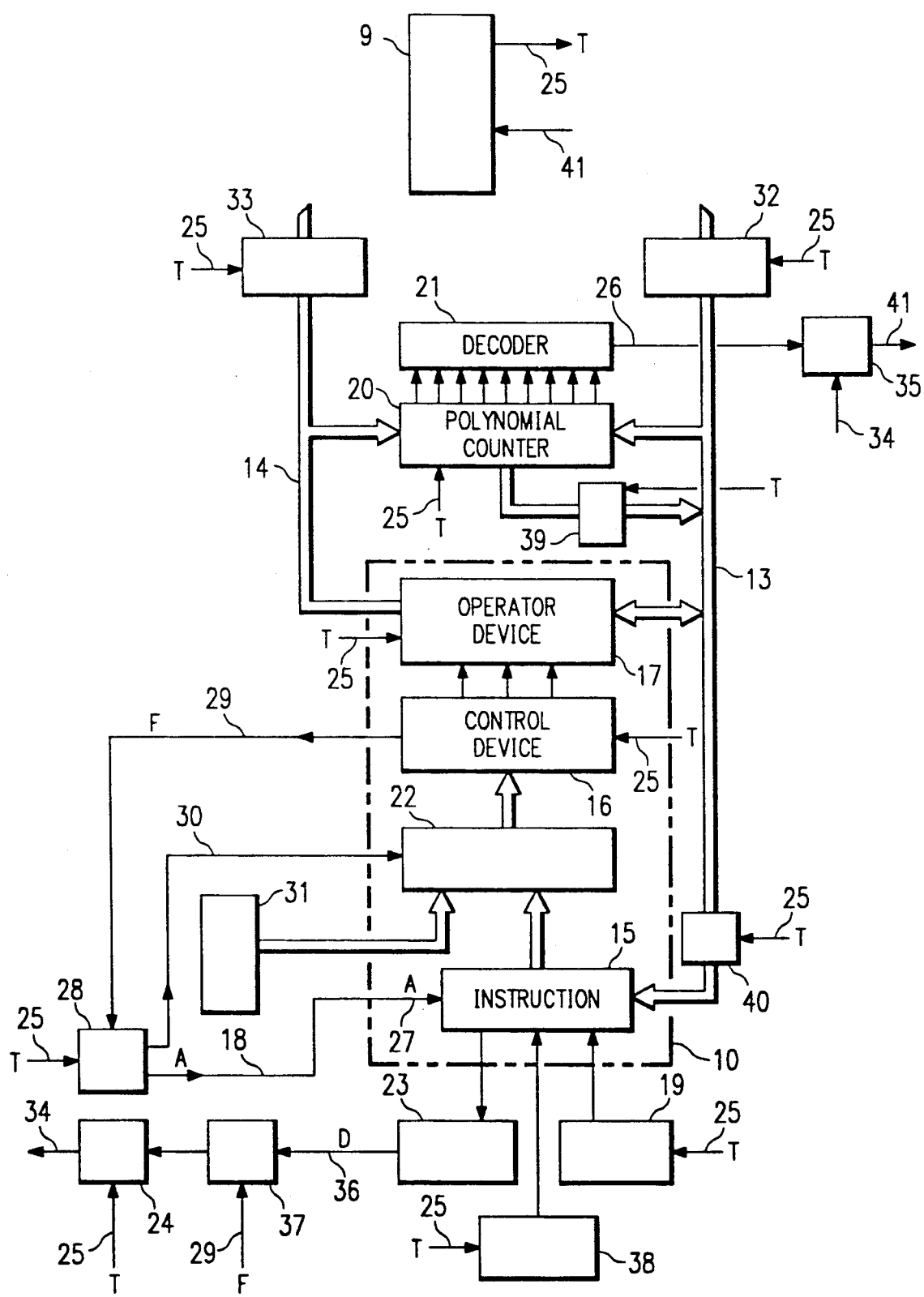
FIG. 2 is a diagram of a microprocessor including an integrated test system according to the present invention.

FIG. 1, described in the preamble, shows the different elements of a computer. The testing system according to the invention concerns the testing of the operation of the central processing unit or processor 10, and includes the following addition elements which shall be described with reference to FIG. 2.

These additional elements comprise mainly a polynomial counter 20 associated with a first decoder circuit or decoder 21, a device 19 for the modification of the connections of the instruction register 15 to convert it into a counter, a first bistable circuit 28, a first register 31 containing a first particular instruction code, a second register 38 containing a second particular instruction code, a routing circuit 22 for routing the codes contained in the instruction register 15 and the register 31, a second decoding circuit or decoder 23 connected to the output terminals of the instruction register 15, a second bistable circuit 24 connected to the output of the second decoder 23 by means of an electronic gate 37. To these additional elements, we must add electronic gates 32 and 33, respectively series-connected on the buses 13 and 14 so as to be capable of disconnecting the memory 11 from the testing system and from the processor during the testing operations. Electronic gates 39 are also provided for in order to connect the outputs of the polynomial counter 20 to the data bus during the testing operations, and to disconnect them during normal operation from the microprocessor. This enables the polynomial counter to be used as an operand transmitter. Finally, the electronic gates 40 are series-connected on the bus 13, at the input of the register/counter 15, to disconnect it from the bus 13 during the testing operations. To enable these different elements 19 to 24 to become active, the system further has a conductor 25 through which a start-of-test signal T is applied to different elements of the processor 10 and of the testing system to place them in predetermined states. These elements are the polynomial counter 20, the operator device 17, the control device 16, the bistable circuits 24 and 28, the instruction register/counter 15 and its modification device 19, and the electronic gates 32, 33, 39 and 40. The signal T is provided by the testing machine 9 to which the microprocessor chip to be tested is connected. This testing machine provides also the chip with electrical power supply.

The polynomial counter 20 is of a standard type and shall not be described in greater detail. The input terminals of this polynomial counter are connected, firstly, to the data bus 13 and, secondly, to the address bus 14. Should, as is usually the case, the address codes have more digits than the data codes, for example 16 and 8 respectively, then only the conductors of the address buses corresponding to the low significance values of the address codes are connected to the input terminals of the polynomial counter 20. The output terminals of the polynomial counter 20 are connected, firstly, to the data bus 13 by means of the electronic gates 39 and, secondly, to the decoder 21. The decoder 21 gives a signal on an output conductor 26 when the code contained in the polynomial counter corresponds to a determined code. This code is determined by a computer simulation of the faultless operation of the processor, it being assumed that the processor is connected to the polynomial counter 20 as described here above.

The code contained in the polynomial counter at the end of the computer simulation of faultless operation constitutes the code that should be arrived at by a testing sequence according to the invention, when there is no fault in the processor. The presence of this code therefore indicates that the processor is working properly and, upon decoding by the circuit 21, gives a signal through the conductor 26. The signal on the conductor 26 is transmitted to the testing machine 9 via an AND gate 35 which is controlled by a signal on a conductor 34 provided by a bistable circuit 24. The output conductor of AND gate 35 is referenced 41.

In a processor, the instruction register receives the operation codes or instruction codes given by the data bus, and therefore works statically. According to the invention, the register 15 works dynamically by modification of the connections among the different stages so that it becomes a counter. For this purpose, it is sufficient to add electronic gates (circuit 19) to the instruction register 15. These gates are controlled by the signal T on the conductor 25. Besides, it is necessary for the register 15 to work only as a counter, in which case it should be disconnected from the data bus 13. This disconnection is obtained by the electronic gates 40, controlled by the signal T. Furthermore, the test sequence should start with a particular instruction code present in register 15. This is obtained by a register or memory 38, containing this code, which is connected to the parallel input terminals of the register/counter 15 and is activated by the signal T. The register/counter 15 passes from one operation code or instruction next one under the control of a signal A applied to a counting input 27 of register/counter 15. The signal A is given by an output terminal 18 of the bistable circuit 28, an input terminal of which is connected to an output terminal 29 or the control device 16. The control 16 gives a signal F when the instruction contained in the register/counter 15 has been carried out, thus making it possible to go on to the next instruction.

The other output terminal 30 of the bistable circuit 28 is connected to the routing circuit 22 which is connected between, on the one hand, the register/counter 15 and the register 31 and, on the other hand, the control device 16. The purpose of this routing device 22 is to send the control device 16 either the code contained in the counter 15 or the code contained in the register 31. According to the invention, the code contained in the register 31 is that of the content-saving instruction. This instruction is aimed at saving the content of a certain number of registers of the operator device 17 and of the control device 16 when an instruction has been fully carried out. Thus, when the control device 16 gives an end-of-instruction signal F on the conductor 29, the bistable circuit 28 changes its state and, through the conductor 30, it gives a signal to the routing circuit 22 which then transmits the content-saving instruction code to the control device 16. The states of the registers to be saved are then transmitted to the polynomial counter by the data bus 13.

The signal A, which is given through the output conductor 18 of the bistable circuit 28, prompts the changing of the state of the register/counter 15 so as to make the next instruction code appear in the normal order of the counting as foreseen by the computer simulation.

The testing system according to the invention, then, works as follows. The test is started by the signal T which is applied through the conductor 25. This signal is applied to several elements of the configuration of FIG. 2. It is applied, first of all, to the electronic gates 40 so as to disconnect the instruction register 15 from the data bus 13, to the circuit 19 so as to configure the register 15 as a counter and to the memory 38 so as to impose an initial instruction code on the register/counter 15. According to the invention, this initial code corresponds to an instruction for reloading the contents of the relevant registers. This instruction is aimed at presetting all the relevant registers to predetermined states. The signal T is also applied to other elements of FIG. 2, as indicated here above, to position them in states that are also predetermined.

The signal T is also applied to the electronic gates 32 and 33 to disconnect the memory 11 (FIG. 1) from the testing system, and to the electronic gates 39 to connect the polynomial counter 20 to the bus 13.

When this first instruction has been carried out, the conductor 29 gives a signal F which, through the bistable circuit 28, permits the transmission from the register 31 to control device 16 of the instruction for saving the contents of various registers, and then prompts the counter 15 to the next counting state corresponding to the next instruction code to be carried out.

As indicted here above, the instruction for saving the contents prompts the saving of the states of the registers in the polynomial counter. The next instruction that is carried out is the one contained in the counter 15 after its change of state, and it is carried out on the basis of the states of the registers at the end of the preceding instruction, namely the contents saving instruction.

It should be noted that, according to one feature of the invention, some of the operands that are needed for carrying out certain instructions are given by the output terminals of the polynomial counter 20, through the electronic gates 39, the polynomial counter being put to work in a reading operation instead of the memories and peripherals.

At the end of the execution of each new instruction, the counter 15 is incremented by one unit so that, after a certain number of successive incrementations, it displays the code of the last instruction to be tested. It is this last instruction decoded by the decoder 23 that then gives a signal D through the output conductor 36. This signal D is applied to the bistable circuit 24 by means of an AND circuit 37 controlled by the signal F of the conductor 29. The signal D is then taken into account only when this latter instruction has been carried out.

The signal given by the bistable circuit 24 on the conductor 34 indicates the end of the testing procedure and is used, firstly, to inform the testing machine of the end of said procedure and, secondly, to transmit (AND circuit 35) the output signal from the decoder 21, present on the conductor 26, to the testing machine.

If the processor has worked properly, the code displayed by the polynomial counter 20 will correspond to the one determined by the computer simulation, and its decoding by the circuit 21 will the inform the testing machine that this processor is working well.

If the processor has not worked properly, the decoding of the content of the polynomial counter will inform the testing machine that this processor is malfunctioning.

The invention has been described by highlighting the means to be added to the standard type microprocessor so that it can itself carry out the test sequence. However, some of these means, notably the electronic gates, exist and it is enough to give them signals by means of complementary electrical connections.

What is claimed is:

1. A system for testing a microprocessor on an integrated circuit chip by conducting a test sequence, said microprocessor including at least one instruction register to receive operation codes of elementary operations, an operator device to carry out the elementary operations corresponding to the thus received operation codes, said operator device containing registers, an operations control device that converts the thus received operation codes into elementary signals for controlling the operator device, said control device containing registers, a polynomial counter, an address bus that connects the operator device to inputs of the polynomial counter, and a data bus that connects the instruction register, the operator device and the polynomial counter to one another, said test system including:
   a first circuit to convert said instruction register into a test counter at the start of a test sequence,
   a second circuit to disconnect said test counter from the data bus at the start of a test sequence,
   a third circuit to record a particular operation code as content in said test counter at the start of a test sequence, the thus recorded operation code corresponding to an instruction for reloading various elements of the microprocessor so as to preset the state of each of said various elements of the microprocessor at a respective predetermined value;
   a fourth circuit to prepare, at the end of an execution of an instruction that has its code contained in said test counter, a content saving instruction to save as code in said polynomial counter the contents of certain registers of said operator device and of said control device, and to increment the content of the test counter by one unit;
   a fifth circuit to determine the end of a test sequence, and
   a sixth circuit to decode code contained in the polynomial counter at the end of a test sequence.

2. A system for testing a microprocessor according to claim 1 wherein a memory having inputs and outputs is associated with the microprocessor, said memory being connected to said microprocessor by said address and data buses, and wherein said test system further includes a seventh circuit for the disconnection, during a test sequence, of the inputs and outputs of said memory from said address and data buses.

3. A system for testing a microprocessor according to claim 1, wherein output terminals of the polynomial counter are connected to the data bus by electronic gates, said electronic gates being controlled so that said output terminals of the polynomial counter are connected to the data bus during the test sequence and thus provide the operands necessary for certain instructions to be carried out.

4. A testing system according to claim 1, wherein said instruction register contains different elements, wherein said first circuit includes first electronic gates that connect the different elements of the instruction register to one another, said first electronic gates being activated only during a test sequence, and wherein said second circuit includes second electronic gates series-connected on the data bus that enable the data bus to be disconnected from the instruction register during a test sequence.

5. A testing system according to claim 1, wherein said third circuit includes a memory containing as content the code of the content reloading instruction, the content of said memory being transferred into the test counter at the start of a test sequence.

6. A testing system according to claim 1, wherein said fourth circuit includes a bistable circuit that changes state at the end of an execution of an instruction so that said bistable circuit gives a signal for transferring the content saving instruction at the end of an execution of an instruction, the code of which is contained in the test counter, and gives a signal for incrementing the test counter at the end of an execution of the content saving instruction.

7. A testing system according to claim 1, wherein said fifth circuit includes a decoder to detect the last instruction of a test sequence that is displayed by the test counter, and a bistable circuit to indicate when the last instruction to be tested in a test sequence has been carried out.

8. A testing system according to claim 1, wherein said sixth circuit includes a decoder to detect code contained in the polynomial counter, and an electronic gate to transmit a signal representative of the thus detected code at the end of a test sequence.

9. A system for testing a microprocessor according to claim 1, wherein output terminals of the polynomial counter are connected to the data bus by first electronic gates, said first electronic gates being controlled so that said output terminals of the polynomial counter are disconnected from the data bus during normal operations and are connected to the data bus during a test sequence in order to provide operands necessary for certain instructions to be carried out.

10. A testing system according to claim 9, wherein said instruction register contains different elements, wherein said first circuit includes second electronic gates that connect the different elements of the instruction register to one another to convert said instruction register to a test counter, said second electronic gates being activated only during a test sequence, and wherein said second circuit includes third electronic gates series-connected on the data bus that enable the data bus to be disconnected from the instruction register during a test sequence.

11. A testing system according to claim 10, wherein said third circuit includes a memory containing as content the code of the content reloading instruction, the content of said memory being transferred into the test counter at the start of a test sequence.

12. A testing system according to claim 11, wherein said fourth circuit includes a bistable circuit that changes state at the end of an execution of an instruction so that said bistable circuit gives a signal for transferring the content saving instruction at the end of an execution of an instruction, the code of which is contained in the test counter, and gives a signal for incrementing the test counter at the end of an execution of the content saving instruction.

13. A testing system according to claim 12, wherein said fifth circuit includes a decoder to detect the last instruction of a test sequence that is displayed by the test counter, and a bistable circuit to indicate when the last instruction to be tested in a test sequence has been carried out.

14. A testing system according to claim 13, wherein said sixth circuit includes a decoder to detect code contained in the polynomial counter, and a fourth electronic gate to transmit a signal representative of the thus detected code at the end of a test sequence.

15. A system for testing a microprocessor according to claim 14 wherein a memory having inputs and outputs is associated with the microprocessor, such associated memory being connected to said microprocessor by said address and data buses, and wherein said test system further includes a seventh circuit for the disconnection, during a test sequence, of the inputs and outputs of said associated memory from said address and data buses.

16. A testing system according to claim 1:
wherein said instruction register contains different elements,
wherein said first circuit includes first electronic gates that connect the different elements of the instruction register to one another, said first electronic gates being activated only during a test sequence,
wherein said second circuit includes second electronic gates series-connected on the data bus that enable the data bus to be disconnected from the instruction register during a test sequence, and
wherein said third circuit includes a memory containing as content the code of the content reloading instruction, the content of said memory being transferred into the test counter at the start of a test sequence.

17. A testing system according to claim 1:
wherein said fourth circuit includes a first bistable circuit that changes state at the end of an execution of an instruction so that said first bistable circuit gives a signal for transferring the content saving instruction at the end of an execution of an instruction, the code of which is contained in the test counter, and gives a signal for incrementing the test counter at the end of an execution of the content saving instruction, and
wherein said fifth circuit includes a decoder to detect the last instruction of a test sequence that is displayed by the test counter, and a second bistable circuit to indicate when the last instruction to be tested in a test sequence has been carried out.

18. A testing system according to claim 17, wherein said sixth circuit includes a decoder to detect code contained in the polynomial counter, and an electronic gate to transmit a signal representative of the thus detected code in response to the second bistable circuit indicating that the last instruction to be tested in a test sequence has been carried out.

19. A testing system according to claim 1:
wherein said instruction register contains different elements,
wherein said first circuit includes first electronic gates that connect the different elements of the instruction register to one another, said first electronic gates being activated only during a test sequence,
wherein said second circuit includes second electronic gates series-connected on the data bus that enable the data bus to be disconnected from the instruction register during a test sequence,
wherein said third circuit includes a memory containing as content the code of the content reloading instruction, the content of said memory being transferred into the test counter at the start of a test sequence,
wherein said fourth circuit includes a first bistable circuit that changes state at the end of an execution of an instruction so that said first bistable circuit gives a signal for transferring the content saving instruction at the end of an execution of an instruction, the code of which is contained in the test counter, and gives a signal for incrementing the test counter at the end of an execution of the content saving instruction, and
wherein said fifth circuit includes a decoder to detect the last instruction of a test sequence that is displayed by the test counter, and a second bistable circuit to indicate when the last instruction to be tested in a test sequence has been carried out.

20. A testing system according to claim 19, wherein said sixth circuit includes a decoder to detect code contained in the polynomial counter, and an electronic gate to transmit a signal representative of the thus detected code in response to the second bistable circuit indicating that the last instruction to be tested in a test sequence has been carried out.

* * * * *